Sept. 13, 1966  R. R. RUDOLPH ETAL  3,272,349
ARTICLE TRANSFERRING APPARATUS
Filed July 13 1964  3 Sheets-Sheet 1
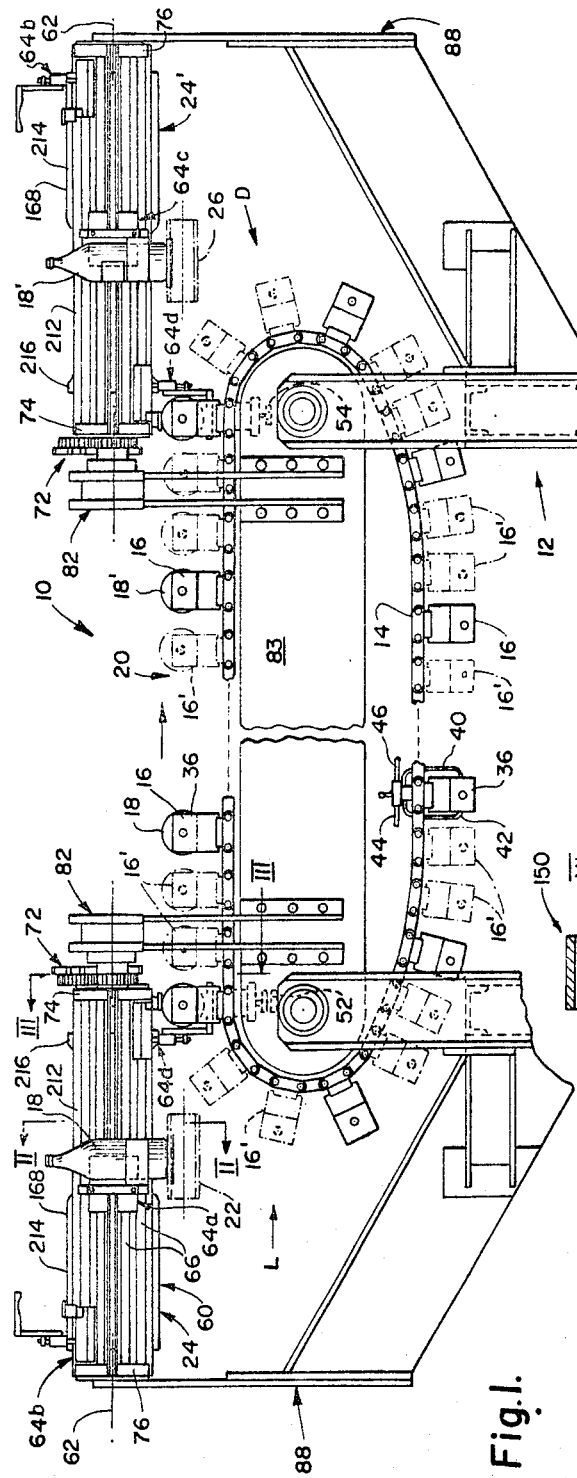
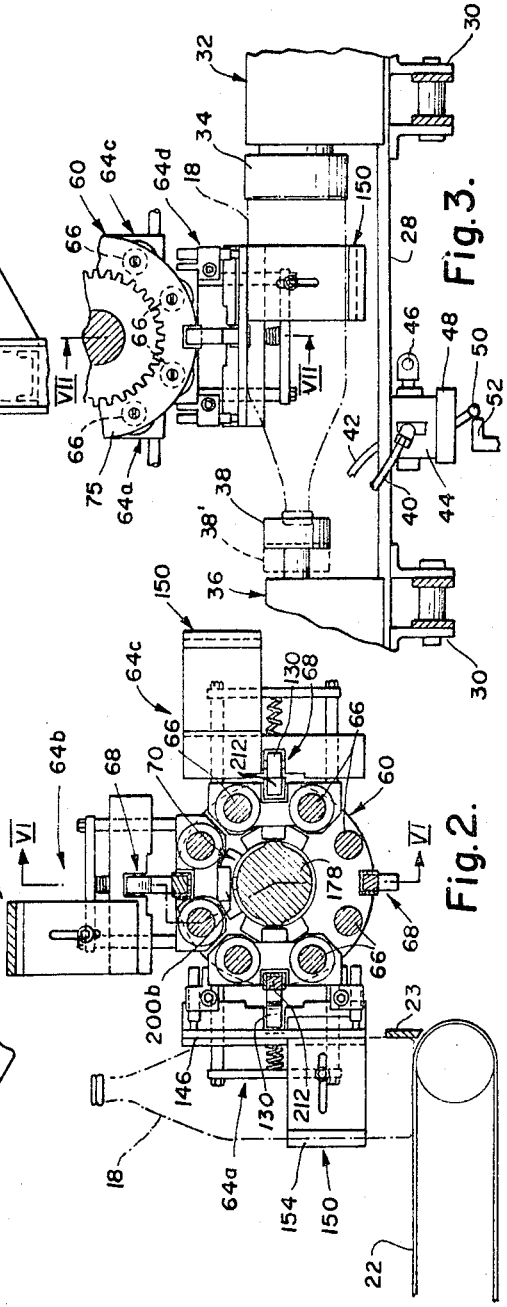
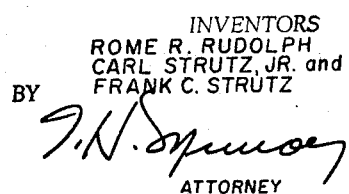
INVENTORS
ROME R. RUDOLPH
CARL STRUTZ, JR. and
FRANK C. STRUTZ
BY
ATTORNEY

3,272,349
ARTICLE TRANSFERRING APPARATUS
Rome R. Rudolph, Gibsonia, and Carl Strutz, Jr., and Frank C. Strutz, Mars, Pa., assignors to Carl Strutz & Co., Inc., Valencia, Pa., a corporation of Pennsylvania
Filed July 13, 1964, Ser. No. 382,005
13 Claims. (Cl. 214—1)

This invention relates to article transferring apparatus, and more particularly to apparatus for transferring articles individually from a first location to a second location which is spaced from the first location while simultaneously changing the orientation of the articles.

Although not limited thereto, the present transferring apparatus is particularly adapted for use with bottle decorating machines having, for example, an endless conveyor supporting a plurality of uniformly spaced bottle supporting devices, one or more bottle decorating stations and an endless conveyor drive means. The present transferring apparatus may be employed at the feed end of the endless conveyor wherein the present apparatus transfers bottles which are to be decorated from a feed conveyor to the endless conveyor. The bottles normally are supported on the feed conveyor in a vertical position and are reoriented to a horizontal position, by means of the present transferring apparatus prior to being deposited on the bottle supporting devices. Alternatively, the present transferring apparatus may be employed at the discharge end of the endless conveyor wherein the decorated bottles are transferred from the endless conveyor to a discharge conveyor. Simultaneously, the bottles are reoriented from their horizontal position on the supporting devices to a vertical position for deposition on the discharge conveyor.

As is known there are two distinct types of bottle decorating machines each of which employ the aforementioned elements. The difference between these types lies in the endless conveyor drive means. The first type of decorating machine is known as an intermittent motion decorating machine and employs a drive means which imparts intermittent traveling movement to the endless conveyor, i.e., the conveyor undergoes a series of individual advances of uniform length, each advance terminating in the complete stoppage of the endless conveyor. An example of this type of decorating machine will be found in U.S. Patent No. 2,231,535. The second type of decorating machine is known as a continuous motion decorating machine employing a drive means which imparts a constant linear velocity to the endless conveyor. That is to say, the bottles are moved through the decorating machine at a constant linear speed without stoppages as in the first type of decorating machine described above. An example of this type of decorating machine will be found in our copending U.S. patent application Serial No. 303,019, filed August 19, 1963, and assigned to the assignee of the present invention.

Although the present transferring apparatus may be used with either of these types of decorating machines, it is particularly useful with the continuous motion decorating machine. This is because the present transferring apparatus may be operated at very high speeds. For all intents and purposes, the speed of operation of the present transferring apparatus is limited only by the speed of operation of the decorating machine on which it is employed. For example, one embodiment of the present transferring apparatus employed in the decorating machine disclosed in our copending U.S. patent application Serial No. 303,019, was able to feed bottles at the rate of 200 per minute, i.e., more than three bottles per second. This high speed of operation has heretofore been impossible to attain.

The present transferring apparatus will be described in conjunction with a bottle decorating machine. It should be understood that the decorating machine described herein may comprise either of the above-described decorating machines. Furthermore, it should be understood that the present transferring apparatus is equally as useful in transferring articles other than bottles and that it may be employed with apparatus other than bottle decorating machines. Hence, the present description and accompanying drawings are intended as illustrative of the utility of the present transferring apparatus in one specific environment.

Furthermore, the present transferring apparatus may be operated in positions other than horizontal as specifically illustrated in the drawings accompanying this specification. Still further, a greater or lesser number of clamping assemblies than shown may be employed and the reorientation of the articles is not limited to that shown in the drawings.

The principal objects of the present invention, include:

To provide apparatus for transferring articles from a first location to a second location which is spaced from the first location;

To provide apparatus for transferring articles individually from a first location to a second location while simultaneously changing the orientation of the articles from their orientation at the first location to a second orientation at the second location;

To provide apparatus for transferring articles while simultaneously reorienting the articles which apparatus may be operated at very high speeds;

To provide transferring apparatus having a plurality of clamping assemblies for transferring articles individually which clamping assemblies are adjustable to receive articles of different sizes;

To provide apparatus for transferring bottles from a feed conveyor to a decorating machine and/or from the decorating machine to a discharge conveyor; and To provide apparatus for loading on or unloading from a decorating machine which decorating machine is either of the intermittent motion type or the continuous motion type.

In accordance with the principles of the present invention, an article transferring apparatus is provided comprising a carrier which is supported for rotation about its longitudinal axis and upon which is mounted a plurality of clamping assemblies. The clamping assemblies are equiangularly spaced about the periphery of the carrier and are individually mounted for reciprocal movement along straight-line paths of travel parallel with the longitudinal axis of the carrier. Each clamping assembly is adapted to receive and transfer one article.

First drive means is provided for moving the clamping assemblies simultaneously along their straight-line paths of travel at a predetermined linear speed. Second drive means is provided for indexing the carrier by intermittently rotating it about its longitudinal axis through a predetermined number of degrees. Thus, each clamping assembly undergoes straight-line movement along its path of travel and rotational movement about the longitudinal axis of the carrier. The combined effect of these two motions is such that each of the clamping assemblies is sequentially presented at a first location and then at a second location which is linearly spaced from as well as angularly spaced from the first position.

By way of example, when the present transferring apparatus is employed for loading bottles onto a decorating machine, the first location or pickup station may be disposed centrally of and to one side of the carrier while the second location or discharge station may be disposed at one end of and beneath the carrier. Alternatively, when the present transferring apparatus is employed for unloading the decorated bottles from the decorating machine, the first location or pickup station may be disposed at the end of and beneath the carrier while the second location or discharge station may be disposed centrally of the carrier and to one side thereof. As can be seen, the first and second locations each may be disposed at the same location with respect to the carrier depending on whether the transferring apparatus is employed as a loading device or an unloading device.

It should also be evident that the positions of the first and second locations with respect to the carrier, as described above, are illustrative of only one means of operating the present transferring apparatus. For example, it could with equal facility be operated so that one of the stations is at the top of the carrier rather than being beneath the carrier.

Further in accordance with the invention, each clamping assembly is provided with a pair of cooperating arms one of which is biased toward the other and movable radially of the longitudinal axis of the carrier. Cam tracks, one each is provided along the path of travel of each clamping assembly. The movable one of the cooperating arms is provided with a cam follower which is normally engaged on one of the cam tracks. The cam track and cam follower provide a means for closing each clamping assembly when at a pickup station whereby an article is picked up for transfer and for opening each clamping assembly when at a discharge station whereby the article transferred is released.

The above and other objects and advantages of the present invention will become apparent from the following detailed description by reference to the accompanying drawings, in which:

FIGURE 1 is a side view illustrating a decorating machine provided with two of the present transferring apparatus, one for loading bottles onto the decorating machine and one for unloading the decorated bottles;

FIG. 2 is a cross-sectional view, taken along the line II—II of FIG. 1, illustrating the pickup of a bottle from a feed conveyor disposed along one side of the present transferring apparatus;

FIG. 3 is a cross-sectional view, taken along the line III—III of FIG 1, illustrating the loading of a bottle onto an endless conveyor of the decorating machine of FIG. 1;

FIG. 4 is a fragmentary isometric view illustrating one of the clamping assemblies employed in the present transferring apparatus;

FIG. 5 is a fragmentary cross-sectional view taken along the line V—V of FIG. 4;

FIG. 6 is a cross-sectional view, taken along the line VI—VI of FIG. 2, illustrating the outboard end of the present transferring apparatus;

FIG. 7 is a cross-sectional view, taken along the line VII—VII of FIG. 3, illustrating the drive end of the present transferring apparatus;

FIG. 8 is a side view of a drive shaft employed in the present transferring apparatus for reciprocating the clamping assemblies of FIG. 4;

FIG. 10 is a cross-sectional view, taken along the line X—X of FIG. 7, illustrating a Geneva drive employed for intermittently rotating the carrier of the present transferring apparatus;

FIG. 11 is a side view illustrating a cam track employed in the present transferring apparatus.

*Decorating machine—general*

Figure 12:
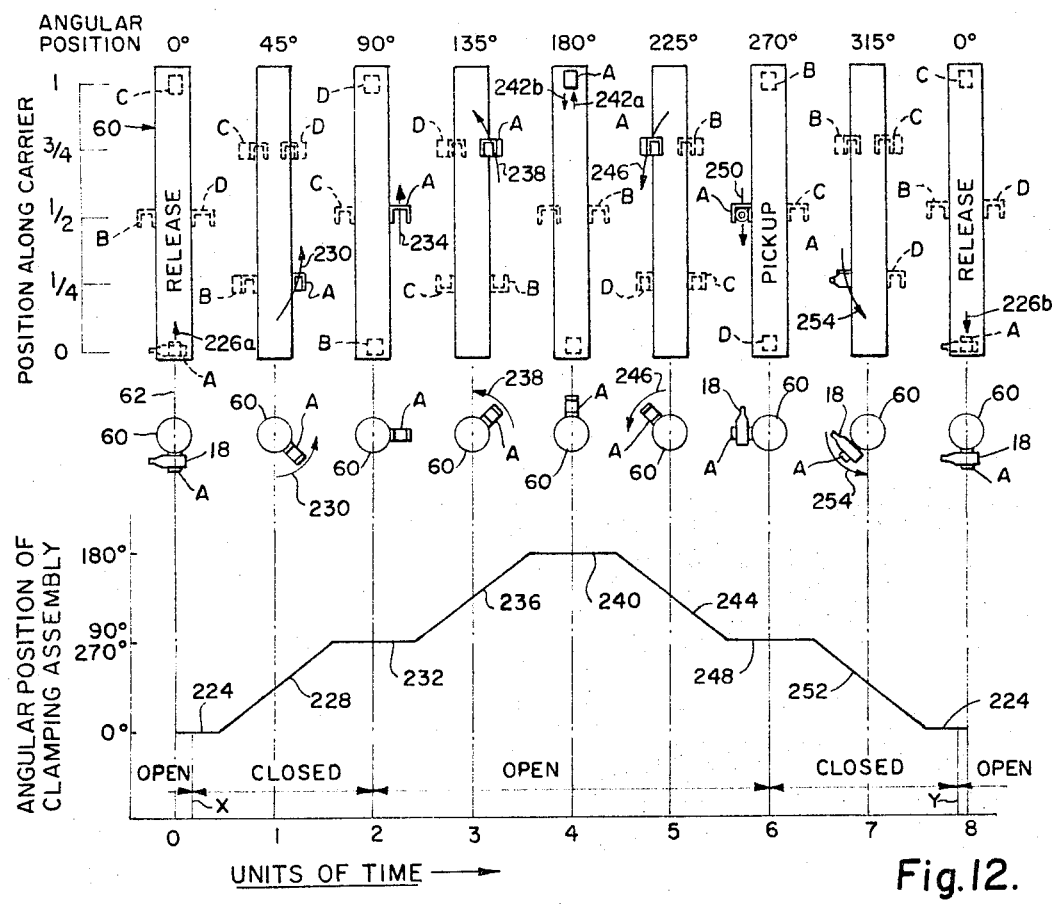
FIG. 12 is a graphic and schematic view illustrating the operation of the present transferring apparatus.

Reference is now directed to FIG. 1 wherein there is illustrated a decorating machine 10 having a base 12 supporting an endless conveyor 14 upon which is mounted a plurality of uniformly spaced bottle supporting devices 16. The decorating machine 10 also includes one or more decorating stations (not shown) at which decorative imprints are applied to the bottles 18 carried by the supporting devices 16. When the decorating apparatus 10 is of the continuous motion type, the supporting devices 16 will be widely spaced. When, however, the decorating apparatus 10 is of the intermittent motion type, the supporting devices will be more closely spaced as illustrated by the devices 16 shown in full lines and by the devices 16' shown in dotted lines.

The decorating machine 10 includes a loading end and a discharge end indicated by the capital letters "L" and "D," respectively. The endless conveyor 14 includes an upper reach 20 which is moved along a straight-line path of travel from the loading end L to the discharge end D, i.e., from left to right as viewed in FIG. 1. As stated above, the decorating machine 10 may be of the intermittent motion type or of the continuous motion type. The difference in operation of the present transferring apparatus as employed with these two types of decorating machines will be described later in this specification.

Adjacent to the loading end L of the decorating machine 10 there is positioned a feed conveyor 22 indicated schematically in dash-dot outline. The feed conveyor 22 serves to introduce the bottles 18 to a transferring apparatus 24 which, in turn, loads the bottles 18 individually onto the supporting devices 16. A stop bar 23 (FIG. 2) holds the bottle 18 in position for pick up. It should be noted that the bottles 18 are upright or vertically oriented when on the feed conveyor 22 and are horizontally oriented when deposited on the supporting devices 16. Hence, the transferring apparatus 24 serves to transfer each of the bottles 18 from a first location (feed conveyor 22) to a second location (supporting devices 16) while simultaneously changing their orientation from a first orientation (vertical) when at the first location to a second orientation (horizontal) when at the second location.

Adjacent to the discharge end D of the decorating machine 10 there is positioned a discharge conveyor 26 schematically illustrated in dash-dot outline. The discharge conveyor 26 receives decorated bottles 18' from a second transferring apparatus 24' which has previously received the decorated bottles 18' from the supporting devices 16. The transferring apparatus 24' serves to transfer the decorated bottles 18' individually from a first location (supporting devices 16) to a second location (discharge conveyor 26) while simultaneously changing their orientation from a first orientation (horizontal) when at the first location to a second orientation (vertical) when at the second location.

It should be understood that the transferring apparatus 24 and 24' are identical in construction and operation. Only the terms first and second location and first and second orientation as applied to the transferring apparatus 24, 24' are interchanged.

Referring now to FIGS. 1 and 3, each of the supporting devices 16 comprises a tie plate 28 having chain links 30 secured at spaced points thereon. The chain links 30 form an integral part of the endless conveyor 14. A base chuck 32 is secured at one end of the tie plate 28 and includes a base cup 34 adapted to engage the bottom of the bottles 18 as shown in FIG. 3. A neck chuck 36 is adjustably secured to the other end of the tie plate 28 and includes a neck cup 38 adapted to move between a clamping position shown in full lines in FIG. 3 and an unclamped position shown in dotted outline at 38'. The base chuck 32 may comprise, for example, that base chuck shown and described in copending application Serial No. 356,198, filed March 31, 1964, and assigned to the assignee of the present invention, whether the decorating apparatus is of the continuous motion type or of the intermittent motion type.

The neck chuck 36 of the decorating machine 10 normally is actuated so that the neck cup 38 clamps the bottles 18 (shown in dash-dot outline) between it and the base cup 34. The neck chuck 36 preferably comprises that neck chuck shown and described in the aforementioned copending application Serial No. 356,198. As disclosed therein, the neck chuck 36 is pneumatically operated with fluid under pressure being introduced therein for moving the neck cup into its clamping position 38 as well as for moving the neck cup into its unclamped position 38'. Conduits 40, 42 leading from a valve 44 mounted on the bottom of the tie plate 28, serve to communicate fluid under pressure for moving the neck cup 38 into its respective positions. A supply conduit 46 communicates the operating fluid to the valve 44. A valve operator 48 controls the introduction of the operating fluid into either of the conduits 40, 42. The valve operator 48 includes an actuating arm 50. As illustrated in FIG. 3, a first valve cam 52 is positioned in the path of travel of the actuating arm 50 serving to displace the actuating arm 50 in the appropriate direction to cause movement of the neck cup 38 into engagement with the bottle 18, as explained above.

As can be seen in FIG. 1, the first valve cam 52 is disposed at a predetermined position, to be explained, in the loading end L of the decorating machine 10. A second valve cam 54 is disposed at a predetermined position, to be explained, in the discharge end D of the decorating machine 10. The first and second valve cams 52, 54 are positioned in the path of travel of the actuating arms 50 of each of the valves 44 and serve to cause clamping and unclamping or release of the bottles 18 at predetermined times, as will be explained, during the movement of each bottle 18 with the endless conveyor 14. It should be understood at this time, that each of the supporting devices 16 includes one of the valves 44 and that the supply conduit 46 is common to all of the valves serving to supply fluid under pressure simultaneously to all of the valves 44. The manner in which fluid under pressure is supplied to all of the valves 44 through the supply conduit 46 is fully described in the aforementioned copending application Serial No. 303,019.

Transferring apparatus—general

Reference is now directed to FIGS. 1 to 3 inclusive for a general description of the transferring apparatus 24, 24'. The transferring apparatus 24, 24' are identical in construction and therefore corresponding numerals will be employed to identify corresponding parts.

The transferring apparatus 24, 24' comprise a carrier generally designated by the numeral 60 which is supported for rotation about its longitudinal axis 62. The carrier 60 supports four clamping assemblies 64a, 64b, 64c and 64d all of which are identical in construction and operation. The clamping assemblies 64a–64d are equiangularly spaced about the periphery of the carrier 60, i.e., 90° apart, and are individually supported on guide rods 66 for reciprocal movement along straight-line paths of travel between the ends of the carrier 60 and parallel to the longitudinal axis 62. Each of the clamping assemblies 64a–64d has associated therewith an actuating means 68 for opening and closing the clamping assemblies 64a–64d at appropriate times for pickup and release of one of the bottles 18. First drive means 70 (FIG. 2) is provided for reciprocating each of the clamping assemblies along the guide rods 66. Second drive means 72 (FIG. 1) is provided for intermittently rotating the carrier 60 about its longitudinal axis 62 whereby, in this embodiment, the carrier 60 is indexed, i.e., rotated through 90°, so that each of the clamping assemblies 64a–64d are sequentially presented at the first location and then at the second location, as will be more fully described later in this specification.

The carrier 60

The carrier 60, best illustrated in FIGS. 1, 2, 6 and 7, comprises, in part, a pair of end plates 74, 76 at the inboard end and outboard end, respectively. The guide rods 66 extending between and through the end plates 74, 76, are secured in place by means of annular retainer plates 75, 77 which are secured to the end plates 74, 76, respectively. As shown in FIG. 7, the end plate 74 is journaled to a tubular member 78 by means of a bearing member 80. The tubular member 78 is secured to a bridge member 82 extending transversely of the decorating machine 10 (FIG. 1) and secured to the side plates 83 of the base 12. As shown in FIGS. 1 and 6, the end plate 76 is journaled to an end plug 84 by means of a bearing member 86. The end plug 84 is secured to supporting structure 88 extending from the base 12 of the decorating machine 10. Thus, the carrier 60 is supported for rotation about its longitudinal axis 62.

The second drive means 72

The second drive means 72, employed in intermittently rotating the carrier 60, is illustrated in FIGS. 7 and 10. The second drive means 72 has an operating cycle comprising alternately a power period or stroke during which the carrier 60 is rotated through 90° and a dwell period during which the carrier 60 is stationary. To accomplish this type of operating cycle, the second drive means 72 comprises the conventional Geneva drive which is well known in the art. As can be seen, a first gear member 90 is secured to the annular retainer plate 75. The first gear member 90 meshes with and is driven by a second gear member 92 mounted on a shaft 94 rotatably mounted on the bridge member 82. A Geneva wheel 96 (best shown in FIG. 10) also is secured to the shaft 94 for rotation therewith. In this instance, the Geneva wheel 96 includes six radially extending slots 98 which are equally angularly spaced from one another, and six shallow concave wells 100, one each between adjacent ones of the radially extending slots 98. A drive member 102 is secured to a drive shaft 104 (FIG. 7) extending through the bridge member 82. A worm wheel 106 also is secured to the shaft 104 and meshes with a worm 108 (FIG. 10) driven by a second drive shaft 110.

The drive member 102 includes a pair of spaced pin members 112 which are adapted to sequentially engage the slots 98 of the Geneva wheel 96 for rotating the same through 60° of arc. Between successive engagements of the pin members 112 with the slots 98, each of two wing members 114 sequentially slide over the concave wells 100 of the Geneva wheel 96. One operating cycle of the drive member 102 comprises movement thereof through 180° of rotation. From the moment of initial engagement of one of the pin members 112 with one of the slots 98 to its disengagement therewith, the drive member 102 rotates through approximately 100° of arc. From the moment of initial engagement of one of the wing members 114 with one of the concave wells 100 to its disengagement therewith, the drive member 102 rotates through approximately 80° of arc. Hence, during the time required for each half revolution of the drive member 102, the carrier 60 is rotated approximately 56% of the time and is stationary 44% of the time. The purpose of the intermittent rotation of the carrier 60 will become evident later in this specification.

Clamping assemblies 64a–64d

The clamping assemblies 64a–64d will be described with reference to FIGS. 1–7 and 9, inclusive. The clamping assemblies 64a–64d are identical in construction and therefore corresponding numerals will be employed to identify corresponding parts.

Referring in particular to FIGS. 4–7, each of the clamping assemblies 64 comprises a support block 120 through which extend a pair of the guide rods 66. Bearing members 122 engaged with each of the guide rods 66 permit free movement of the support block 120 thereover. The bearing members 122 preferably comprise journals known as ball bushings. Projecting upwardly from a central location on the support block 120 are two spaced guide shafts 124 whose outer ends are connected by means of a tie bar 126. A clamping block 128 is slidable on the guide shafts 124 and has a roller 130 rotatably secured centrally therein. A spring member 132 is interposed between the clamping block 128 and the tie bar 126 and serves to bias the clamping block 128 toward the support block 120. At the forward end of the support block 120 there are secured clamp members 134, one each on each side of the support block 120. The clamp member 134 includes a slot 136 leading from one edge thereof to an opening 138 in which is clamped a rod member 140 supporting a bar 142. A bolt 144 serves to clamp the rod 140 in any desired elevated position. A second bar member or arm 146 extends between and is secured to the bars 142 and serves as a base upon which rests the bottle 18, shown in dotted outline in FIG. 5.

Secured to the clamping block 128 and extending thereabove is a first plate 148. Adjustably secured to the first plate 148 is an angle member 150 having a vertical arm 152 and a horizontal arm 154. The vertical arm 152 has a slot 156 formed therein, through which extends a bolt 158 employed in clamping the angle member 150 to the first plate 148. The slot 156 provides for adjusting the position of the horizontal arm 154 with respect to a predetermined point 160 which is coincident with the center line of the bottle 18. The slot 156 provides adjustment through a distance indicated at 162. The horizontal arm 154 preferably is provided with a concave surface 164 preferably corresponding in curvature with the largest diameter bottle 18.

The horizontal arm 154 and the second bar members 146 comprise a pair of cooperating arms one of which (horizontal arm 154) is biased toward the other and is movable radially of the longitudinal axis 62 of the carrier 60 (see FIG. 7). The cooperating arms 146, 154 are adjustable whereby bottles of different diameters may be clamped. For example, in one embodiment of the present transferring apparatus 24, 24', the cooperating arms 146, 154 will accept bottles having diameters falling in the range of from one inch to three and one-half inches.

As shown in FIGS. 4, 6, 7 and 9, the support block 120 has a central groove 166 extending parallel to the guide rods 66. A cam track 168 and cam track support channel 170 extends through the groove 166. The roller 130 is in rolling engagement with the cam track 168 and follows the contour of the cam track 168 to raise and lower the arm 154 thereby releasing and clamping, respectively, the bottle 18, as will be explained. The roller 130 and the cam track 168 comprise the aforementioned actuating means 68.

*First drive means 70*

The first drive means 70 is fully illustrated in FIGS. 2, 6–10, inclusive. Referring in particular to FIG. 8, the first drive means 70 comprises, in part, a single shaft 178 having superimposed right-hand and left-hand threads 180, 182, respectively, formed in its outer surface. The shaft 178 is driven about its longitudinal axis 184 in the direction of the arrow. As will be explained, the right-hand thread 180 will drive the clamping assemblies 64a–64d to the right of FIG. 8 while the left-hand thread 182 will drive the clamping assemblies 64a–64d to the left of FIG. 8. At each end of the shaft 178 there is provided a turning thread 186 which joins the right and left-hand threads 180, 182.

As can best be seen in FIG. 6, one end of the shaft 178 is journaled by means of a bearing member 188 to the end plug 84. As can be seen in FIG. 7, at the other end of the shaft 178 there is provided a first cut-down end portion 190 which is journaled by means of a bearing member 192 to the tubular member 78. At the extreme end of the shaft 178 there is provided a second cut-down end portion 194 to which there is secured a worm wheel 196 which meshes with a worm 198 secured to the shaft 110 (FIG. 10). The shaft 178 is disposed centrally of the carrier 60 with its longitudinal axis 184 coincident with the longitudinal axis 62 of the carrier 60.

Figure 9:
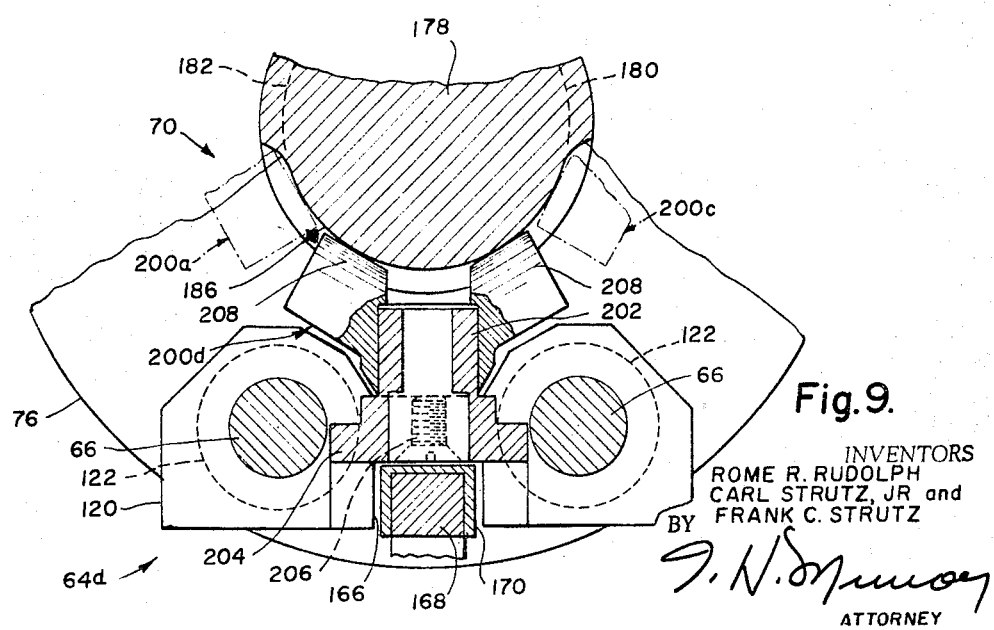
FIG. 9 is a cross-sectional view, taken along the line IX—IX of FIG. 7, illustrating a follower employed for connecting the clamping assemblies of FIG. 4 with the drive shaft of FIG. 8.

As stated above, the first drive means 70 reciprocates each of the clamping assemblies 64a–64d along the guide rods 66 between the end plates 74, 76 and parallel with the horizontal axes 62, 184 of the carrier 60 and the shaft 178, respectively. As can be seen in FIG. 9, a follower 200d is pivotal about a stub shaft 202 projecting from the support block 120 of the clamping assembly 64d. The stub shaft 202 is integral with a mounting plate 204 secured to the supporting block 120 by means of a plurality of bolts 206 only one of which is shown. The follower 200d has a pair of laterally extending tooth members 208 adapted to engage, in FIG. 9 one of the turning threads 186. The shaft 178 is driven in a counterclockwise direction, hence, the follower 200d will, in turn, be driven by the left-hand thread 182 so that the clamping assembly 64b will be moved to the left of FIG. 7, i.e. away from the decorating machine 10 (FIG. 1).

The follower 200d drives the clamping assembly 64d. Fragments of the followers 200a and 200c, employed to drive the clamping assemblies 64a and 64c, respectively, are shown in dash-dot outline to illustrate their positions relative to the follower 200d. The clamping assembly 64b also has associated therewith a follower 200b which is shown in FIG. 2.

*Actuating means 68*

Referring now to FIGS. 1, 6, 7 and 11, each cam track 168 extends parallel with the longitudinal axis 62 of the carrier 60. The cam track support channel 170 extends between the end plates 74 and 76 and secured thereto by means of bolts 210 (FIGS. 6 and 7). Each cam track 168 comprises a low portion 212, a first elevated portion 214 adjacent to the end plate 76 and a second elevated portion 216 adjacent to the end plate 74 and the decorating machine 10. The roller 130 of each of the clamping assemblies 64a–64d rides over its associated cam track 168 during reciprocal movement thereof along the guide rods 66.

This cam track 168 is constructed to permit operation of the transferring apparatus 24, 24' in a certain manner. In FIG. 11, four positions of the roller 130 are illustrated in dotted outline and indicated by 130–1, 130–2, 130–3 and 130–4. It should be understood that each roller 130 of each of the clamping assemblies 64a–64d will undergo the movement now to be described.

Referring now to FIGS. 4 and 11, when the roller 130 is at position 130–1 the horizontal arm 154 will be in an elevated position since the roller 130 will be engaged with the first elevated portion 214. When the clamping assembly 64 is at the position indicated by roller 103–2, the horizontal arm 154 will have been lowered into a clamping position.

In FIG. 11, the roller 130–2 is shown engaged with the low portion 212 of the cam track 168. However, as shown in FIG. 2, when a bottle 18 is clamped between the horizontal arm 154 and the second bar 146 of the clamping assembly 64a, the roller 130 will be spaced from the low portion 212. As shown by the clamping assembly 64c in FIG. 2, the roller 130 will be engaged with the low portion 212 when a bottle 18 is not being clamped.

When the clamping assembly 64 is at the position indicated by the roller 130–3 (FIG. 11), the bottle carried thereby is about to be released. When the clamping assembly 64 is at the position indicated at 130–4, the horizontal arm 154 will have been displaced radially away from the support block 120 thereby releasing the bottle transferred. During movement of the clamping assembly 64 in the reverse direction—to the right of FIG. 11— the horizontal arm 154 will be displaced sequentially in a clamping direction and then in an unclamping direction.

Second drive shaft 110

As illustrated in FIGS. 6 and 7, the shaft 178 is rotatable about its longitudinal axis 184 independently of the rotation of the carrier 60 about its longitudinal axis 62. However, since both carrier 60 and the shaft 178 are driven by means of the second drive shaft 110 (FIG. 10), they are rotated in timed relation with one another. The desired timed relation may be accomplished by the proper choice of the pitch diameters of the worm wheels 106, 196; the worms 108, 198; and the first and second gears 90, 92. Consequently, an adjustment of the speed of rotation of the second drive shaft 110 will cause corresponding changes in speeds of rotation of the carrier 60 and the shaft 178.

The shaft 110 includes a sprocket 220 having a drive chain 222 engaged therewith. The drive chain 222 extends from the sprocket 220 to the main drive (not shown) of the decorating machine 10. Hence, the first and second drive means 70, 72 are driven in timed relation with the endless conveyor 14 (FIG. 1), the arrangement being such that an adjustment in the speed of the endless conveyor 14 will result in corresponding adjustments in the speeds of rotation of the carrier 60 and the shaft 178.

Operation

The first drive means 70 reciprocates each of the clamping assemblies 64a–64d along straight-line paths of travel defined by the guide rods 66 and at a predetermined constant linear speed. Further, the carrier 60 is rotated intermittently about its longitudinal axis 62 by the second drive means 72. It should be remembered that the drive means 72 has an operating cycle composed of alternate power periods and dwell periods. The resulting motion of each clamping assembly is schematically and graphically illustrated in FIG. 12.

In the graph portion of FIG. 12, the ordinate indicates the angular position of a clamping assembly with respect to the longitudinal axis 62. The abscissa indicates time.

In the upper portion of FIG. 12, there is schematically illustrated a series of carriers 60 each having four clamping assemblies A, B, C and D at various angular positions and at various linear positions along the carrier 60 during one complete cycle of operation of the clamping assembly A. For the purpose of explanation, eight units of time have been arbitrarily chosen as the length of time required by the clamping assembly A to complete one cycle of operation. Further, the angular position of the clamping assembly A will be indicated in degrees. Still further, the length of the carrier 60 has been arbitrarily chosen as one. Thus, the position of the clamping assembly A relative to the length of the carrier 60 will be indicated by "0" when at that end of the carrier 60 which is adjacent to the decorating machine; by "1" when at the other end of the carrier 60; and by the fractions ¼, ½ and ¾ when at points intermediate of the ends of the carrier 60. In the graph portion of FIG. 12, the horizontal line segments indicate linear motion of the clamping assembly A while the spaced line segments indicate linear motion as well as rotational movement of the clamping assembly A.

At time zero, the clamping assembly A has an angular position of 0° (that is, beneath the carrier 60) and is at position 0 with respect to the length of the carrier 60. The clamping assembly A has released the bottle 18 for pickup by one of the supporting devices 16 (FIG. 1) of the decorating machine 10 and will begin linear movement indicated by the horizontal line segment 224 in the direction of the arrow 226a. The cooperating arms 146, 154 (FIG. 4) are substantially immediately closed at time X upon movement of the clamping assembly A in the direction of the arrow 224a by the cooperative action of the roller 130 and the second elevated portion 216 of cam track 168.

At time "1," the clamping assembly A is at angular position 45° and at a linear position ¼. The assembly A thus is undergoing simultaneous linear motion and rotational movement with respect to the axis 62 as indicated by the sloped line segment 228 and in the direction indicated by the arcuate arrow 230.

During the dwell period of the second drive means 72, the clamping assembly A will undergo only linear motion as indicated by the horizontal line segment 232 and in the direction of arrow 234. At time "2," the clamping assembly is at angular position 90° and linear position ½. During movement of the clamping assembly A between time X and 2, the cooperating arms 146, 154 remain closed. Beyond time 2, however, the roller 130 engages the first elevated portion 214 of the cam track 168 so that the cooperating arms 146, 154 are open.

During the subsequent power period of the second drive means 72, the clamping assembly A will undergo simultaneous linear motion and rotational movement as indicated by the sloped line segment 236 and in the direction of arrows 238. Thus, at time 3, the clamping assembly A is at angular position 135° and linear position ¾.

During the subsequent dwell period of the second drive means 72, the clamping assembly A will undergo linear motion as indicated by the horizontal line segment 240. However, one-half of its travel will be in the direction of arrow 242a and the other half in the direction of arrow 242b. At time 4 the clamping assembly A will be at angular position 180° (on top of the carrier 60) and linear position 1 (at the far end of the carrier 60).

During the subsequent power period of the second drive means 72, the clamping assembly A will undergo simultaneous linear motion and rotational movement as indicated by the sloped line segment 244 in the direction of the arrow 246. At time 5, the clamping assembly A will be at angular position 225° and at linear position ¾.

During the subsequent dwell period of the second drive means 72, the clamping assembly A will undergo only linear motion as indicated by the horizontal line segment 248 in the direction of the arrow 250. At time 6, then, the clamping assembly A will be at angular position 270° and at linear position ½. During movement of the clamping assembly A from time 2 to time 6, the cooperating arms 146, 154 are in an open condition. However, beyond time 6, the roller 130 will ride off the first elevated portion 214 of the cam track 168 whereby the cooperating arms 146, 154 will close. Consequently, for the transferring apparatus 24 (FIG. 1) that position of the clamping assembly A defined by angular position 270° and linear position ½ (FIG. 12) corresponds to the first location or pickup station. The clamping assembly A, thus, will pick up a bottle 18 for transfer. Notice that the bottle 18 is vertical.

During the subsequent power period of the second drive means 72, the clamping assembly A and the bottle 18 will undergo linear motion and rotational movement as indicated by the sloped line segment 252 in the direction of arrows 254. At time 7, the clamping assembly A and the bottle 18 will be at angular position 315° and linear position ¼.

During the subsequent dwell period of the second drive means 72, the clamping assembly A will undergo linear motion as indicated by the horizontal line segment 224, half of which is in the direction of arrow 226b and the other half of which is in the opposite direction as indicated by the arrow 226a at time zero. During movement of the clamping assembly A from time 6 to time Y, the cooperating arms 146, 154 clamp the bottle 18. However, beyond time Y, the cooperating arms 146, 154 are opened thereby releasing the bottle 18. Consequently, for the transferring apparatus 24 (FIG. 1), that position of the clamping assembly A defined by angular position 0° and linear position 0 corresponds to the second location or discharge station. Notice that the bottle 18 is now horizontal.

In the case of the transferring apparatus 24, each of the clamping assemblies 64a–64d will be sequentially presented at the first location (angular position 270°) for pickup of a bottle 18 oriented vertically and then at the second location (angular position 0°) for discharging the bottle 18 which now is horizontally oriented.

In the case of the transferring apparatus 24' (FIG. 1), each of the clamping assemblies 64a–64d will be sequentially presented at the first location (angular position 0°) for pickup of a bottle oriented horizontally and then at a second location (angular position 90°) for discharging the bottle which now is vertically oriented.

*Operation with continuous motion decorating machine*

The present transferring apparatus 24, 24' may be used in a continuous motion type decorating machine wherein the supporting devices 16 are driven at a constant linear speed. In this instance, it is important to note that the clamping assemblies 64a–64d and the supporting devices 16 are driven at the same constant linear speed. In this manner there will be no relative motion between the clamping assemblies and the supporting devices during the transfer of a bottle from one to the other. Thus, during transfer of a bottle, the central axis of the bottle and the central axis of the bottom and neck chucks 32, 36 will be coincident.

When the transfer occurs from a clamping assembly to a supporting device, as during the loading of the bottles on the decorating machine, the cooperating arms 146, 154 release the bottle 18 when the clamping assembly and the supporting device are traveling in the direction of arrow 226b (FIG. 12, time 8). The first valve cam 52 (FIG. 1) will be positioned so that it actuates the neck chuck 36 for clamping just as the clamping assembly releases the bottle (time Y+).

When the transfer occurs from a supporting device to a clamping assembly, as during the unloading of the decorating machine, the cooperating arms 146, 154 clamp a decorated bottle 18' when the clamping assembly and the supporting device are traveling in the direction of the arrow 226a (FIG. 12, time 0). The second valve cam 54 (FIG. 1) will be positioned so that it actuates the neck chuck 36 for releasing just as the clamping assembly clamps the bottle (time X+).

*Operation with intermittent motion decorating machine*

The present transferring apparatus 24, 24' may be used on an intermittent motion type decorating machine wherein the supporting devices undergo intermittent traveling movement. In this instance it is important to note that transfer of a bottle occurs either from a clamping assembly to a supporting device or from a supporting device to a clamping assembly, only when the clamping assembly and the supporting device are stationary. At the point where the clamping assembly A reverses its direction of movement (FIG. 12, time 0), the clamping assembly A is momentarily stationary. The overall arrangement is such that the supporting devices 16 will be stationary before the clamping assemblies reach the point of reversal of direction of movement. Again there will be no relative motion between the clamping assemblies and the supporting devices during the transfer of the bottles 18'. It should also be noted that the central axis of the bottle and the central axis of the bottom and neck chucks 32, 36 will be coincident during the transfer of the bottle.

Although the present invention has been shown in connection with specific embodiments, it will be readily apparent to those skilled in the art that various changes in form and arrangement of parts may be made to suit requirements without departing from the spirit and scope of the present invention.

We claim as our invention:

1. Apparatus for transferring articles individually from a first location to a second location while simultaneously changing the orientation of said articles from a first orientation when at said first location to a second orientation when at said second location, said apparatus comprising in combination: an elongated carrier supported for rotation about its central longitudinal axis; a plurality of spaced clamping assemblies individually mounted on said carrier for reciprocal movement along straight-line paths of travel, each of said clamping assemblies having a pair of cooperating arms biased in a clamping direction and adapted to receive one of the articles to be transferred, a first of said cooperating arms being movable radially of said axis and having a cam follower rotatably mounted thereon; cam tracks mounted on said carrier, one each disposed along the path of travel of each of said clamping assemblies; the cam follower of each of said clamping assemblies being engaged with the respective cam track; said cam follower and said track cooperating to sequentially (a) open said cooperating arms during movement thereof away from both said first and second locations, (b) close said cooperating arms when at said first location to effect pickup of the article to be transferred, and (c) open said cooperating arms when at said second location to release the article transferred; and second drive means for rotating said carrier whereby the article transferred is rotated from said first orientation to said second orientation during transfer from said first location to said second location.

2. The apparatus of claim 1 including a spring member for biasing said first of said cooperating arms toward the other of said cooperating arms.

3. The apparatus of claim 1 wherein a second of said cooperating arms includes an adjustable support for changing its position relative to said longitudinal axis of said carrier.

4. Apparatus for transferring articles individually from a first location to a second location while simultaneously changing the orientation of said articles from a first orientation when at said first location to a second orientation when at said second location, said apparatus comprising in combination: an elongated carrier supported for rotation about its longitudinal axis; a plurality of clamping assemblies individually mounted on said carrier for reciprocal movement along straight-line paths of travel; first drive means for reciprocating each of said clamping assemblies, said first drive means comprising at least one shaft having superimposed right and left-hand threads provided thereon, each clamping assembly including a follower engaged in one of said threads for connecting the clamping assembly to said shaft, and means for driving said shaft; means for closing each of said clamping assemblies when at said first location for pickup of an article to be transferred; means for opening each of said clamping assemblies when at said second location for releasing the article transferred; and second drive means for rotating said carrier whereby the article transferred is rotated from said first orientation to said second orientation during transfer from said first location to said second location.

5. Apparatus for transferring articles individually from a first location to a second location while simultaneously changing the orientation of said articles from a first orientation when at said first location to a second orientation when at said second location, said apparatus comprising in combination: an elongated carrier supported for rotation about its longitudinal axis; a plurality of spaced clamping assemblies individually mounted on said carrier for reciprocal movement along straight-line paths of travel; first drive means for reciprocating each of said clamping assemblies, said first drive means comprising a single shaft disposed on said longitudinal axis of said carrier, said shaft having superimposed right and left-hand threads provided thereon, each of said clamping assemblies having a follower pivotally secured thereto and engaged in one of said threads, and means for driving said shaft, each of said followers being alternately engaged in said right and left-hand threads whereby each of said clamping assemblies is reciprocated along said straight-line path of travel; means for closing said clamping assemblies when at said first location for pickup of an article to be transferred; means for opening each of said clamping assemblies when at said second location for releasing the article transferred; and second drive means for rotating said carrier whereby the article transferred is rotated from said first orientation to said second orientation during transfer from said first location to said second location.

6. Apparatus for transferring articles individually from a first location to a second location while simultaneously changing the orientation of the longitudinal axes of said articles from a first orientation when at said first location to a second orientation when at said second location, said apparatus comprising in combination: an elongated carrier supported for rotation about its longitudinal axis; a plurality of spaced clamping assemblies individually mounted on said carrier for reciprocal movement along straight-line paths of travel; first drive means mounted on said carrier for reciprocating each of said clamping assemblies; means for closing each of said clamping assemblies when at said first position for pickup of an article to be transferred with its longitudinal axis in said first orientation; means for opening each of said clamping assemblies when at said second position for releasing the article transferred with its longitudinal axis in said second orientation; and second drive means for intermittently rotating said carrier whereby the article transferred and hence its longitudinal axis is rotated from said first orientation to said second orientation during transfer from said first location to said second location, said second drive means comprising a Geneva drive having a power stroke for rotating said carrier and first and second dwell periods wherein said carrier is not rotated, said power stroke causing rotation of said carrier only during an intermediate portion of the travel of each of said clamping assemblies between said first and second locations.

7. Apparatus for transferring articles individually from a feed location to a discharge location while simultaneously changing the orientation of said articles from a first orientation to a second orientation, said first and second orientations being substantially mutually perpendicular, said apparatus comprising in combination: an elongated carrier supported for rotation about its longitudinal axis; clamping assemblies, each mounted on said carrier for reciprocal movement along straight-line paths of travel, said clamping assemblies being equiangularly spaced about said carrier, each of said clamping assemblies having a pair of cooperating arms biased in a clamping direction and adapted to receive one of the articles to be transferred, one of said cooperating arms being movable radially of said longitudinal axis; first drive means for reciprocating all of said clamping assemblies simultaneously, said first drive means comprising a shaft disposed on said longitudinal axis and having superimposed right and left-hand threads provided thereon, follower members, one each pivotally mounted on each of said clamping assemblies and engaged in one of said threads, and means for rotating said shaft whereby each of said clamping assemblies is moved reciprocably along its straight-line path of travel and sequentially past said feed location and said discharge location; means for closing the cooperating arms of each of said clamping assemblies when at said feed location for pickup of an article to be transferred; second drive means for intermittently rotating said carrier whereby the article transferred is rotated from said first orientation to said second orientation during transfer from said first location to said second location, said second drive means causing rotation of said carrier only during an intermediate portion of the travel of each of said assemblies from said first location to said second location; and means for opening the cooperating arms of each of said clamping assemblies when at said second location for releasing the article transferred.

8. Apparatus for transferring articles individually from a feed location to a discharge location while simultaneously changing the orientation of said articles from a first orientation to a second orientation, said apparatus comprising in combination: an elongated carrier supported for rotation about its longitudinal axis; a plurality of spaced holding assemblies individually mounted on said carrier for reciprocal movement along straight-line paths of travel and each adapted to receive one of said articles for transfer; first drive means for reciprocating each of said holding assemblies along its straight-line path of travel, each of said holding assemblies being sequentially positioned at said feed location for pickup of an article to be transferred and then at said discharge location for discharging the article transferred; second drive means for intermittently rotating said carrier, said second drive means having an operating cycle comprising a first dwell period, a power stroke and a second dwell period, said first and second drive means working in unison whereby during the travel of each of said holding assemblies from said feed location to said discharge location, each of said holding assemblies undergoes (1) only linear motion toward said discharge location, (2) combined linear motion toward said discharge location and rotation about said longitudinal axis of said carrier whereby the article transferred is rotated from said first orientation to said second orientation, and (3) only linear motion toward said discharge location; and a plurality of supporting devices each sequentially positioned at one of said locations at the same time as each of said holding assemblies are positioned at the same location for transfer of an article from one to the other, there being substantially no relative motion between said holding assemblies and said supporting devices during transfer of an article from one to the other.

9. The apparatus of claim 8 wherein said supporting devices are positioned at said feed location, the articles being transferred from said supporting devices to said holding assemblies.

10. The apparatus of claim 8 wherein said supporting devices are positioned at said discharge location, the articles being transferred from said holding assemblies to said supporting devices.

11. The apparatus of claim 8 wherein said holding assemblies are driven at a constant linear speed along said path of travel and said supporting devices being driven at the same constant linear speed.

12. The apparatus of claim 8 wherein said holding assemblies are driven at a constant linear speed and said supporting devices undergo intermittent movement.

13. In decorating apparatus for applying decorative imprints to generally cylindrical workpieces, having an endless conveyor provided with a plurality of uniformly spaced supporting devices each adapted to support one of said workpieces in a horizontal orientation during its decoration, means for driving said endless conveyor along a path of travel, a feed conveyor supporting said workpieces in a vertical orientation for carrying said workpieces to said decorating apparatus, first transfer means for transferring said workpieces individually from said feed conveyor to said supporting devices while simultaneously reorienting said workpieces from said vertical orientation to said horizontal orientation, a discharge conveyor supporting said workpieces in a vertical orientation for carrying the decorated workpieces away from said decorating apparatus; and second transfer means for transferring the decorated workpieces from said supporting devices to said discharge conveyor while simultaneously reorienting the decorated workpieces from said horizontal orientation to said vertical orientation, the improvement in said transfer means comprising: an elongated carrier supported adjacent to one end of said endless conveyor for rotation about its longitudinal axis, said longitudinal axis being substantially parallel with the path of travel of said endless conveyor; a plurality of spaced holding assemblies individually mounted on said carrier for reciprocal movement along straight-line paths of travel parallel with said longitudinal axis, each of said holding assemblies being adapted to receive one of said workpieces for transfer; first drive means for reciprocating each of said holding assemblies along its path of travel whereby each of said holding assemblies is sequentially positioned at one of said conveyors for pickup of one of said workpieces and then at the other of said conveyors for discharge of the workpiece transferred from said carrier, there being substantially no relative motion between said holding assemblies and said supporting devices during transfer of a workpiece from one to the other; and second drive means for intermittently rotating said carrier during movement of each of said clamping assemblies between said conveyors whereby the workpiece transferred is rotated from its orientation when on one of said conveyors to a second orientation on the other of said conveyors.

References Cited by the Examiner

UNITED STATES PATENTS

| | | | |
|---|---|---|---|
| 1,935,739 | 11/1933 | Freese | 214—1 |
| 2,216,990 | 10/1940 | Taylor | 74—57 |
| 2,843,027 | 7/1958 | Sevison | 214—1 X |
| 2,950,805 | 8/1960 | Heimlicher | 214—1 X |
| 3,018,007 | 1/1962 | Williams | 214—1 |
| 3,075,634 | 1/1963 | Schwacofer | 214—1 X |

MARVIN A. CHAMPION, *Primary Examiner.*